(12) United States Patent
Radziszewski et al.

(10) Patent No.: US 12,341,396 B2
(45) Date of Patent: Jun. 24, 2025

(54) LINEAR MOTOR AND SYSTEMS THEREWITH

(71) Applicant: NEVOMO POLAND SPOLKA Z OGRANICZONA ODPOWIEDZIALNOSCIA MINSKA, Warsaw (PL)

(72) Inventors: Pawel Radziszewski, Warsaw (PL); Tomasz Kublin, Warsaw (PL)

(73) Assignee: NEVOMO POLAND SP. Z O.O., Warsaw (PL)

(*) Notice: Subject to any disclaimer, the term of this patent is extended or adjusted under 35 U.S.C. 154(b) by 883 days.

(21) Appl. No.: 17/605,884

(22) PCT Filed: Apr. 30, 2020

(86) PCT No.: PCT/EP2020/062020
§ 371 (c)(1),
(2) Date: Oct. 22, 2021

(87) PCT Pub. No.: WO2020/221855
PCT Pub. Date: Nov. 5, 2020

(65) Prior Publication Data
US 2022/0247296 A1 Aug. 4, 2022

(30) Foreign Application Priority Data
Apr. 30, 2019 (PL) .......................... 429814

(51) Int. Cl.
H02K 41/02 (2006.01)
B60L 13/06 (2006.01)
B60L 13/08 (2006.01)

(52) U.S. Cl.
CPC ............. *H02K 41/02* (2013.01); *B60L 13/06* (2013.01); *B60L 13/08* (2013.01); *B60L 2200/26* (2013.01); *H02K 2201/03* (2013.01)

(58) Field of Classification Search
CPC ...... B60L 2200/26; B60L 13/04; B60L 13/06; B60L 13/03; B60L 13/08; H02K 41/02; H02K 2201/03
See application file for complete search history.

(56) References Cited

U.S. PATENT DOCUMENTS 3,516,361 A * 6/1970 Hart .......................... B60V 3/04
104/23.2
3,791,309 A 2/1974 Baermann
(Continued)

FOREIGN PATENT DOCUMENTS

DE 2043604 3/1972
DE 102009014497 9/2010
(Continued)

OTHER PUBLICATIONS

International Search Report and Written Opinion issued by the European Patent Office, dated Jul. 27, 2020, for International Patent Application No. PCT/EP2020/062020; 15 pages.

*Primary Examiner* — Zachary L Kuhfuss
*Assistant Examiner* — Cheng Lin
(74) *Attorney, Agent, or Firm* — Faegre Drinker Biddle & Reath LLP

(57) ABSTRACT

Linear motor comprising a stator, and a mobile motor part comprising at least one motor element separated from the stator by an airgap (G) configured to be electromagnetically coupled thereto to generate thrust on the mobile element in a track direction (A). At least one of the stator and the mobile motor part comprises an electromagnet and at least the other of the stator and mobile motor part comprises one or more of a permanent magnet, an electromagnet, an induction plate. The linear motor further comprises at least one control system, airgap sensors connected to the control system configured to measure a length of the airgap between the mobile motor part and the stator, and actuators connected to (Continued)

the control system coupled to a support of the mobile motor part and to the motor element, the actuators receiving control signals from the control system to adjust said length of the airgap.

21 Claims, 8 Drawing Sheets

(56) References Cited

U.S. PATENT DOCUMENTS

| | | | | |
|---|---|---|---|---|
| 4,075,538 | A * | 2/1978 | Plunkett | B61C 15/12 |
| | | | | 318/52 |
| 5,360,470 | A * | 11/1994 | Ono | F16C 32/044 |
| | | | | 104/284 |
| 8,047,138 | B2 * | 11/2011 | Tozoni | B60L 13/10 |
| | | | | 104/282 |
| 10,557,534 | B2 * | 2/2020 | Chung | H02K 7/06 |
| 2006/0000383 | A1 * | 1/2006 | Nast | B60L 13/10 |
| | | | | 104/282 |
| 2008/0257197 | A1 * | 10/2008 | Hahn | B60L 13/08 |
| | | | | 104/282 |
| 2011/0100251 | A1 * | 5/2011 | Zheng | B61B 13/08 |
| | | | | 104/284 |

FOREIGN PATENT DOCUMENTS

| | | | | |
|---|---|---|---|---|
| EP | 2479871 | | 7/2012 | |
| GB | 1129290 | | 10/1968 | |
| GB | 1203025 | | 8/1970 | |
| GB | 1313211 | | 4/1973 | |
| JP | S60113651 | | 6/1985 | |
| JP | S6278603 | | 4/1987 | |
| KR | 20150068095 | A * | 6/2015 | B61B 13/08 |

* cited by examiner

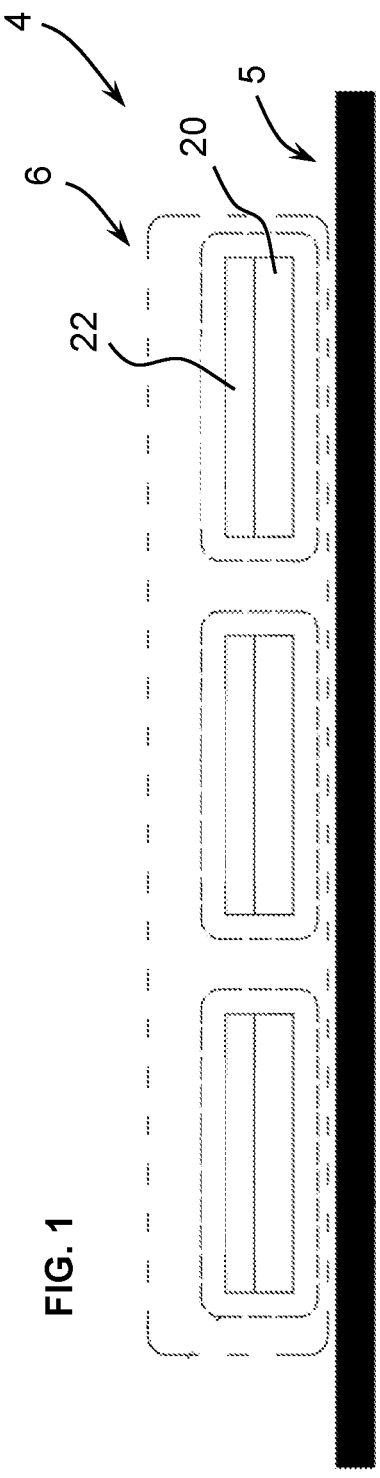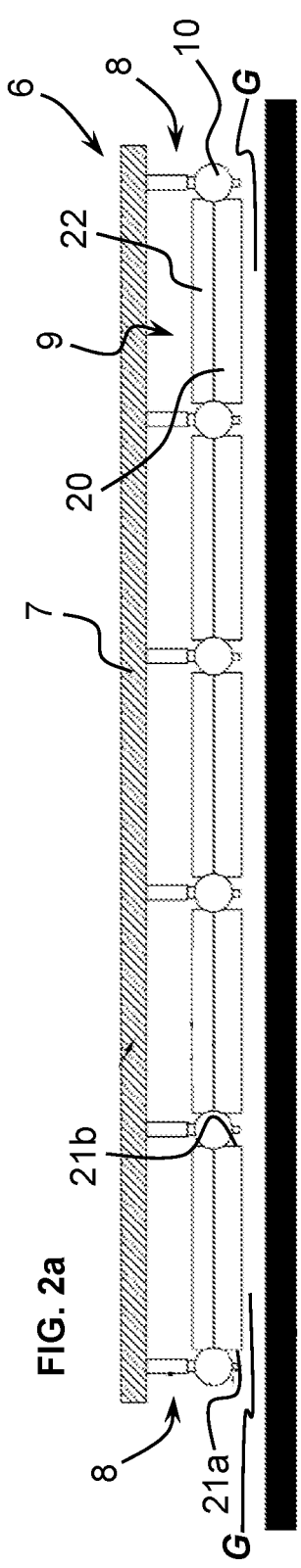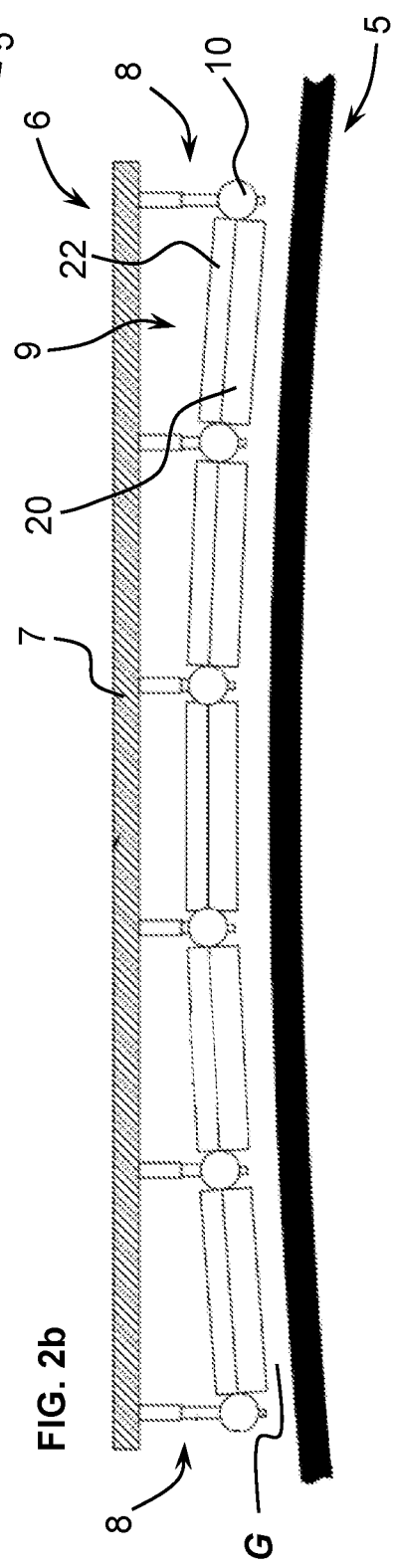

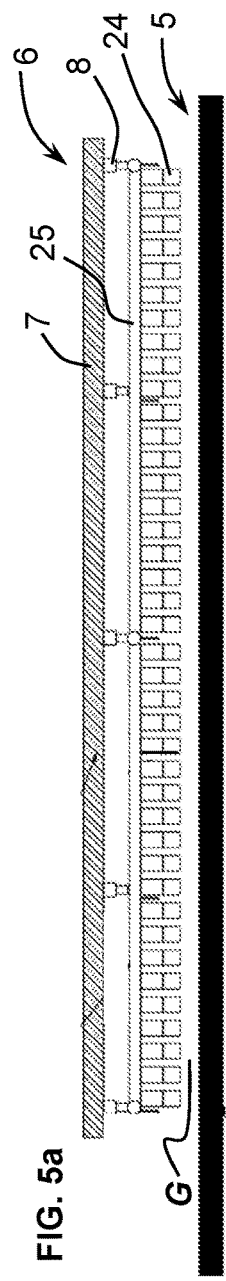
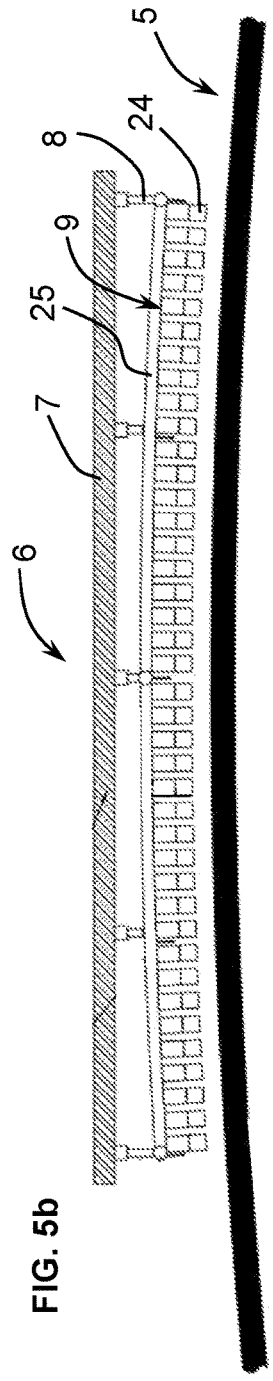
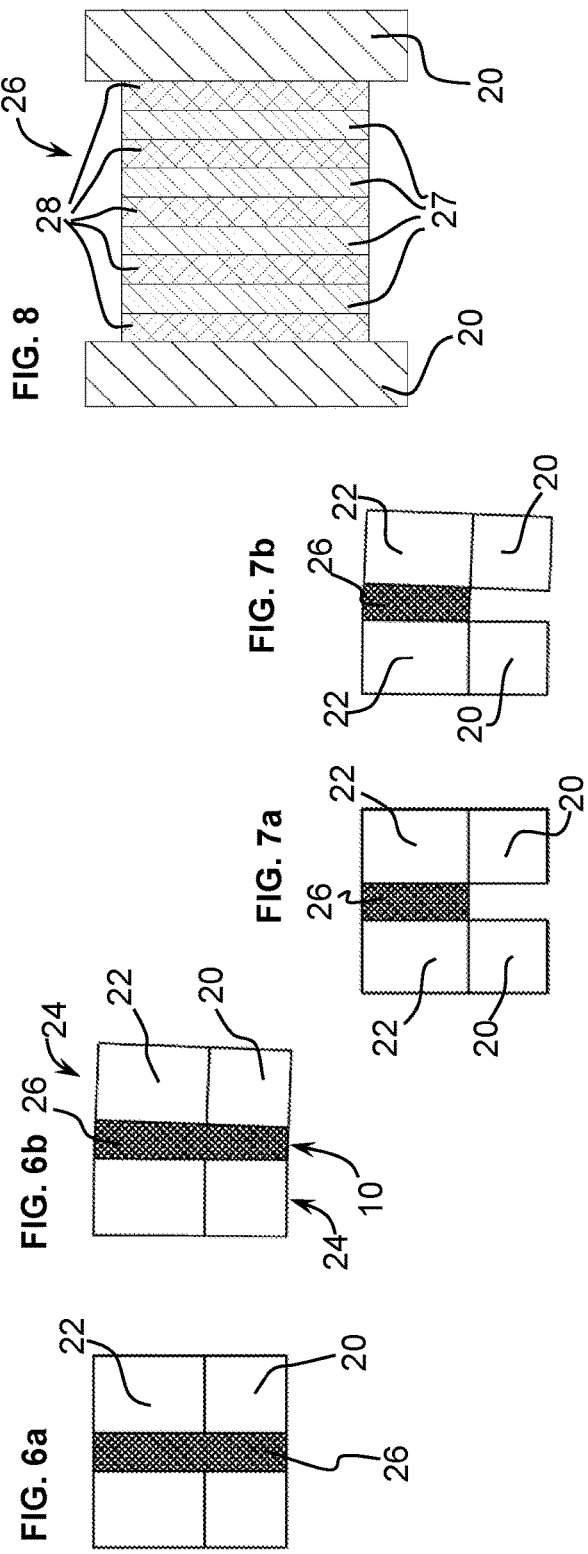

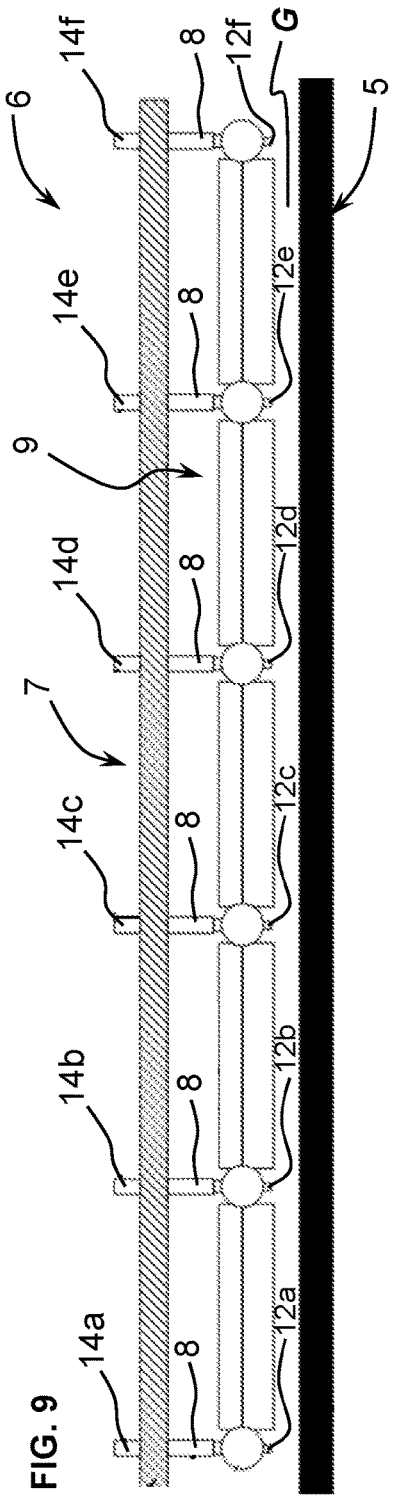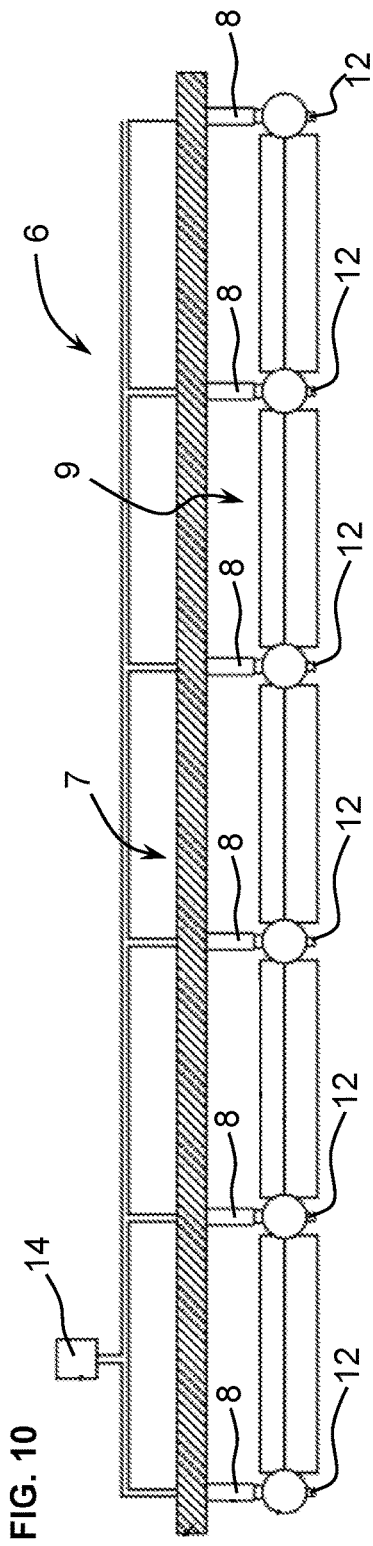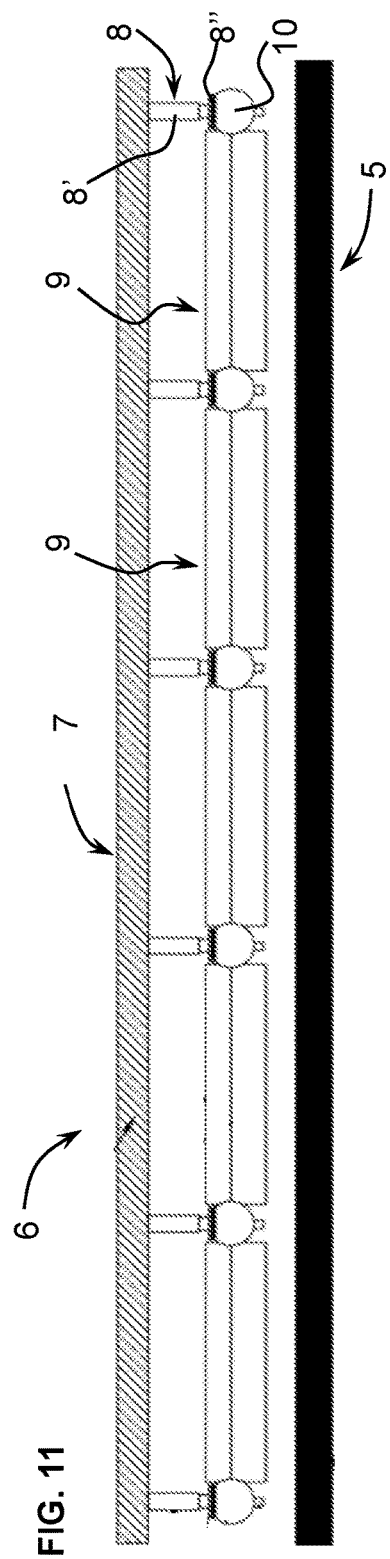

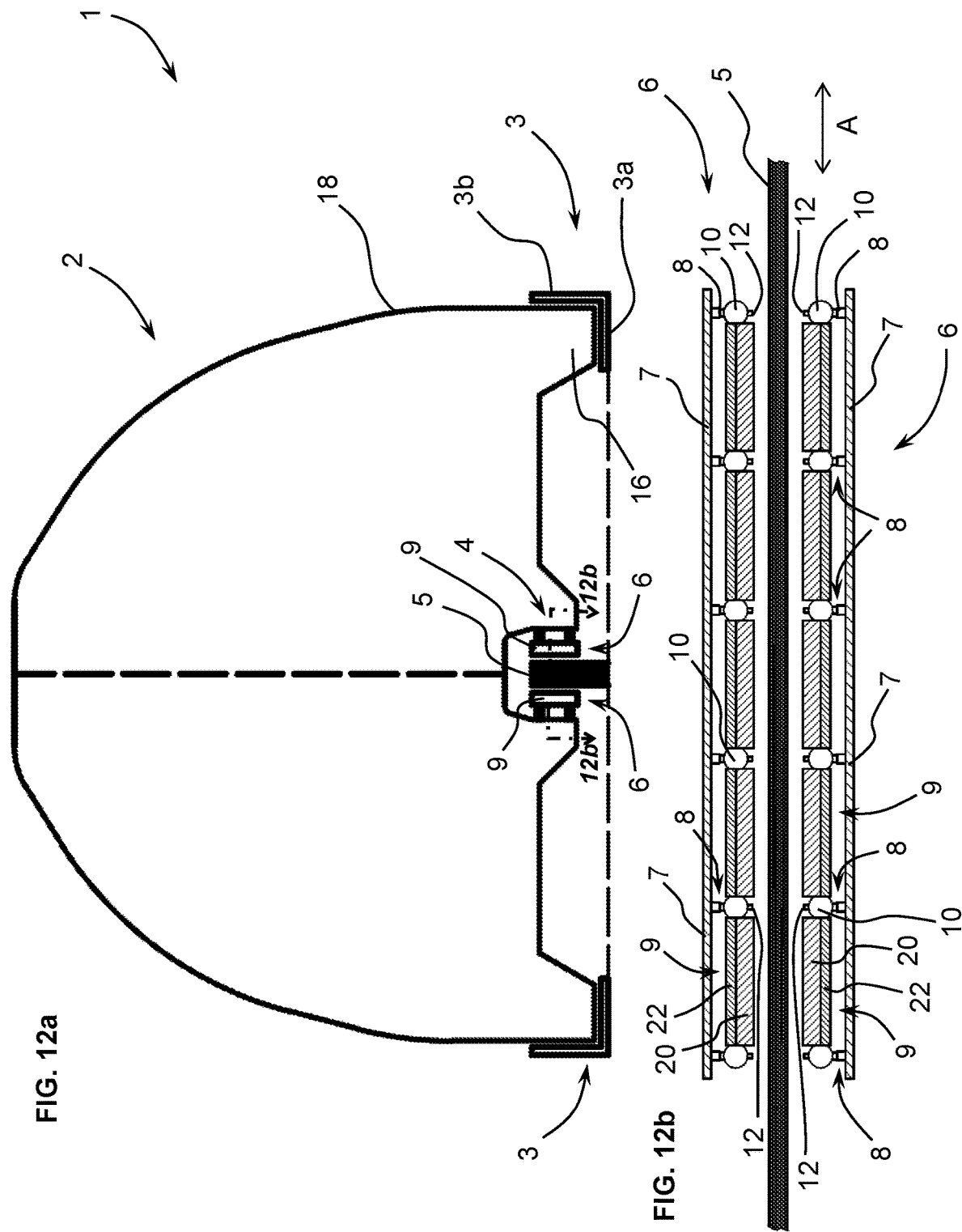

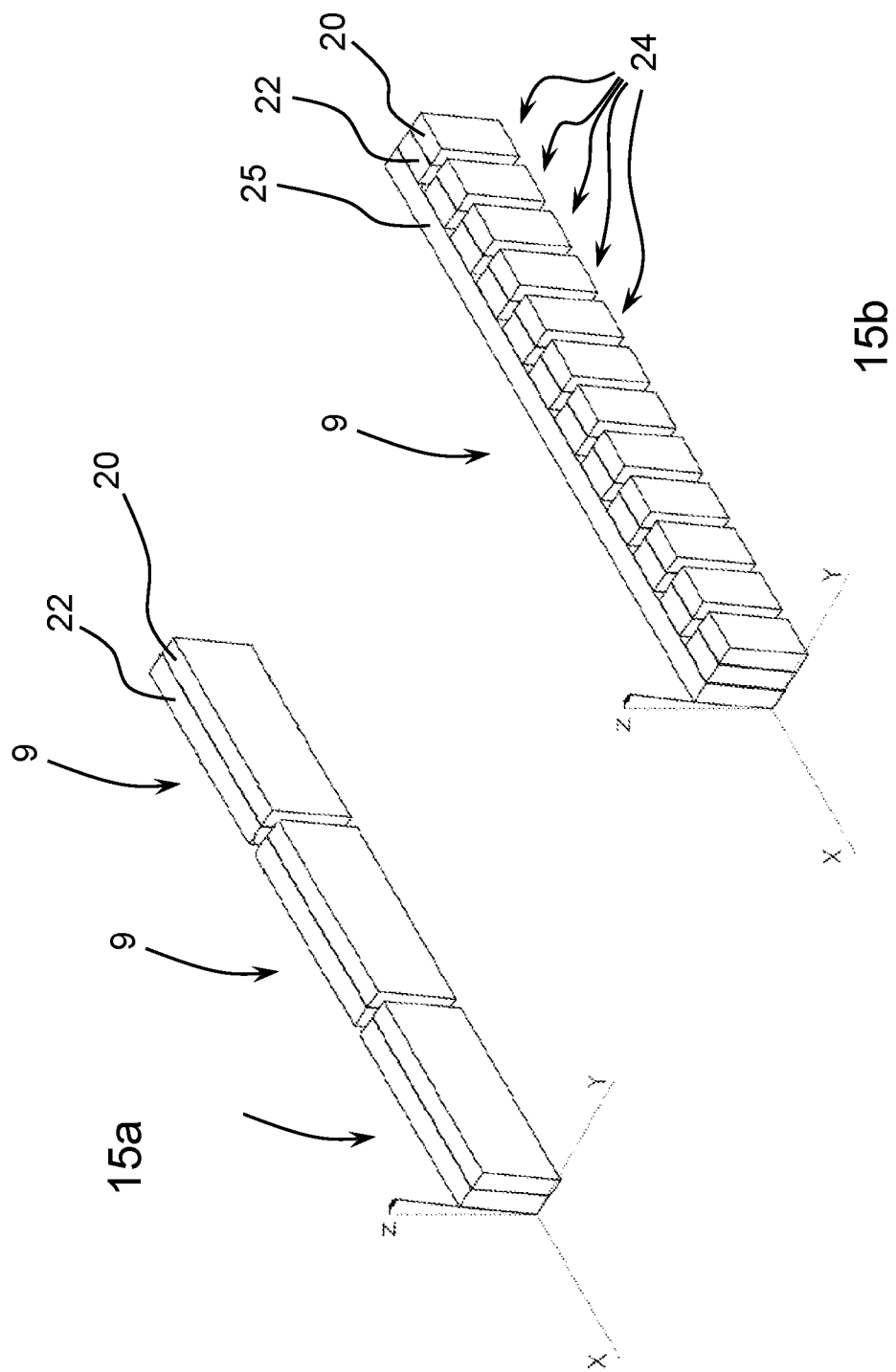

LINEAR MOTOR AND SYSTEMS THEREWITH

CROSS-REFERENCE TO RELATED APPLICATIONS

The present application is a national stage entry of International (PCT) Patent Application Number PCT/EP2020/062020, filed Apr. 30, 2020, which in turn claims priority to Polish Patent Application No. P.429814, filed Apr. 30, 2019, the subject matter of which are expressly incorporated herein by reference.

FIELD OF THE INVENTION

The present invention relates to a linear electrical motor. In one of the applications, the linear motor may in particular be implemented in magnetic levitation systems for guiding objects, for instance a magnetic levitation railway system, or more generally for driving any object along guide rails. In other applications the linear motor may be implemented in systems for accelerating and projecting objects.

BACKGROUND OF THE INVENTION

It is known to include linear motors in a railway track for generating thrust to drive a magnetically levitated train. Using an existing railway track infrastructure provides a significant advantage in reducing the costs and time for implementation, although there are some compromises needed since existing infrastructures are usually not optimized for magnetic levitation systems. Magnetic levitation systems have particularly high performance when implemented in a vacuum tube that reduces air friction and allows an increase in velocity and a decrease in energy consumption. The ease of implementation, in particular adaptation of the existing network to integrate a magnetic levitation system with minimal impact on the existing conventional railway track is an important factor. Considering that existing railway tracks may have various surfaces, ballasted or non-ballasted, adaptation to these varying surfaces along the railway line also need to be taken into account.

It is known to move mobile elements of a magnetic levitation system in order to lift up the vehicle off a track when starting the vehicle as described in US 2011/0100251 and US 2008/0257197. It is also known to pivot magnetic levitation elements in a horizontal plane in order to follow the curvature of a magnetic levitation rail as described in US 2006/0000383 and JP6-278603. These various mechanisms however are not concerned with the improving the propulsion force of the motor of the vehicle and they do not discuss how to improve the efficiency of the motor as such. The aforementioned systems are concerned with improving with the magnetic levitation of the vehicles of a railway of a train.

While certain linear motors are incorporated in the magnetic levitation tracks, it is generally more advantageous to separate the motor from the magnetic levitation system. Linear motors for railway vehicles are typically of a considerably shorter length than the overall length of the vehicle and are thus better able to follow curved tracks without requiring any special mechanism as found in levitation systems of the railway track. Nevertheless, the air gap of the linear motor needs to take into account the curvature and other intolerances in the position of the stator of the motor with respect to the mobile element mounted on the railway vehicle.

Since the efficiency of the linear motor depends to a large extent on the gap between the stator and the motor mobile element, it would be advantageous to have the smallest possible gap to increase efficiency.

SUMMARY OF THE INVENTION

In view of the foregoing, it is an object of the invention to provide a linear motor that is efficient and compact.

Another object of the invention, for one of the specific applications, is to provide a linear motor for a magnetic levitation railway system that is powerful, yet efficient and compact.

It is advantageous to provide a linear motor that has a high power to weight ratio or high power to volume ratio.

It is advantageous to provide a linear motor that can be easily implemented and is reliable.

It is another object of the invention to provide a vacuum tube railway system with magnetic levitation that is quick and easy to install, particularly in existing infrastructures.

It is advantageous to provide a vacuum tube railway system for integration in existing infrastructures that can be quickly deployed in the existing infrastructure and that can be easily adapted to varying conditions of the existing infrastructure.

Objects of the invention have been achieved by providing the system according to claim 1.

Dependent claims recite various advantageous features of the invention.

Disclosed herein is a linear motor comprising a stator, and a mobile motor part comprising at least one motor element separated from the stator by an airgap configured to be electromagnetically coupled thereto to generate thrust on the mobile element in a track direction. At least one of the stator and the mobile motor part comprises an electromagnet and at least the other of the stator and mobile motor part comprises one or more of: a permanent magnet, an electromagnet, an induction plate. The linear motor further comprises: at least one control system; airgap sensors connected to the control system configured to measure a length of the airgap between the mobile motor part and the stator; and actuators connected to the control system coupled to a support of the mobile motor part and to the motor element, the actuators receiving control signals from the control system to adjust said length of the airgap.

In an advantageous embodiment, the mobile motor part comprises a plurality of motor elements connected together via hinge coupling elements.

In an advantageous embodiment, the mobile motor part comprises one or more motor elements each comprising a plurality of segments connected together via flexible hinges.

In an advantageous embodiment, the hinge coupling elements comprise flexible material including an elastomer.

In an advantageous embodiment, the flexible hinges comprise flexible material including an elastomer.

In an advantageous embodiment, the flexible material comprises an elastomeric material with ferromagnetic properties, for instance an elastomer with ferromagnetic particles embedded therein.

In an embodiment, a plurality of said motor segments are mounted on a bendable or flexible support. The bendable support is configured to be able to bend to a degree allowing the motor elements to follow the maximum curvature of the stator, for instance defined by the maximum curvature of a railway track.

In an embodiment, the flexible hinges extend over a portion of an interface between adjacent segments. In a variant, the flexible hinges extend over the whole interface between adjacent segments.

In an embodiment, the hinges comprise a sandwich construction of layers of a magnetic or ferromagnetic material and layers of an elastomeric material doped with a ferromagnetic particles.

In an embodiment, the hinge coupling elements comprise a mechanical pivot and axis hinge.

In an advantageous embodiment, the stator comprises electromagnetic coils producing the thrust energy and the mobile motor part comprises motor elements or segments with permanent magnets.

In an advantageous embodiment, the mobile motor part comprises ferromagnetic cores and magnets mounted thereon facing the stator.

In advantageous embodiments, the airgap sensors may be mounted: at an end of each actuator; or on each of the hinge coupling elements; or on mobile motor segments at a position proximate the actuator.

In advantageous embodiments, the airgap sensor is selected from a group consisting of: optical sensors, inductive sensors, laser sensors, ultrasonic sensors, capacitive sensors.

In embodiments, the actuators are selected from a group consisting of: electrical actuators, electromechanical actuators, pneumatic actuators, hydraulic actuators, piezoelectric actuators, or combinations of the foregoing.

In an advantageous embodiment, the actuator is an electromagnetic actuator comprising an electromagnetic linear motor with a linear nut and screw system.

In an advantageous embodiment, the actuator comprises a first actuation device and a second actuation device, the first actuation device generating a coarse adjustment and the second actuation device generating a fine adjustment.

In an advantageous embodiment, the fine adjustment actuation device comprises a piezoelectric actuator.

In an embodiment, the actuators are individually controlled, each connected to a dedicated control system receiving signals from an airgap sensor at, or proximate, the actuation device.

In an embodiment, the control system is a central control system connected to a plurality of actuators and airgap sensors.

In an advantageous embodiment, the mobile motor part comprises two portions arranged symmetrically about the stator, a first portion on one side of the stator and a second portion on the other side of the stator.

In a preferred embodiment, the first and second lateral outer surfaces of the stator are vertical.

In other embodiments, the first and second lateral outer surfaces of the stator are may be curved (e.g. cylindrical, or partially cylindrical), or inclined (e.g. two faces of a triangular shape).

Also disclosed herein is a magnetic levitation railway system comprising a railway vehicle guided on levitation rail tracks, and a linear motor according to embodiments and variants described above, the mobile motor part being mounted to a chassis of the railway vehicle and the stator coupled to a ground or base.

In an advantageous embodiment, the linear motor is separate and independent of the levitation rail tracks.

In an advantageous embodiment, the linear motor is positioned centrally between a pair of said levitation rail tracks.

Further objects and advantageous aspects of the invention will be apparent from the claims, and from the following detailed description and accompanying figures.

BRIEF DESCRIPTION OF THE FIGURES

The invention will now be described with reference to the accompanying drawings, which by way of example illustrate embodiments of the present invention and in which:

FIG. 1 is a schematic cross-sectional top view of main parts of a linear motor;

FIG. 2a is a view similar to FIG. 1 but of an embodiment of the invention;

FIG. 2b is a view of the embodiment of FIG. 2a on a curved section of the stator;

FIG. 5a is a view similar to FIG. 2a of yet another embodiment;

FIG. 5b is a view similar to FIG. 2b but corresponding to the embodiment of FIG. 5a;

FIGS. 6a and 6b are simplified schematic view of segments of a motor element of the embodiment of FIGS. 5a and 5b respectively;

FIGS. 7a and 7b are similar to FIGS. 6a and 6b of a variant;

FIG. 8 is a view of segments of a motor element of yet another embodiment of the invention;

FIG. 9 is a view similar to FIG. 2a of a variant where the actuation elements are individually controlled;

FIG. 10 is a view similar to FIG. 9 however with the actuation elements centrally controlled;

FIG. 11 is a view similar to FIG. 2a of yet another embodiment;

FIG. 12a is a simplified schematic view of a railway vehicle with a linear motor according to embodiments of this invention;

FIG. 12b is a cross-sectional view through lines 12b-12b of FIG. 12a

FIGS. 15a and 15b are respective simplified schematic views illustrating the tilting action of a mobile element of a linear motor according to embodiments of this invention.

DETAILED DESCRIPTION WITH REFERENCE TO THE FIGURES

Figure 3:
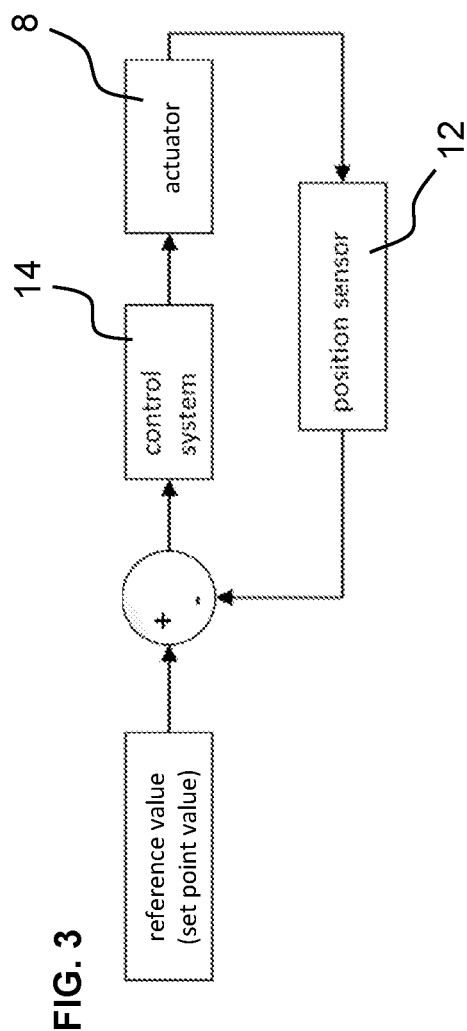
FIG. 3 is a simplified schematic block diagram of a linear motor control system according to an embodiment of the invention.
Figure 4:
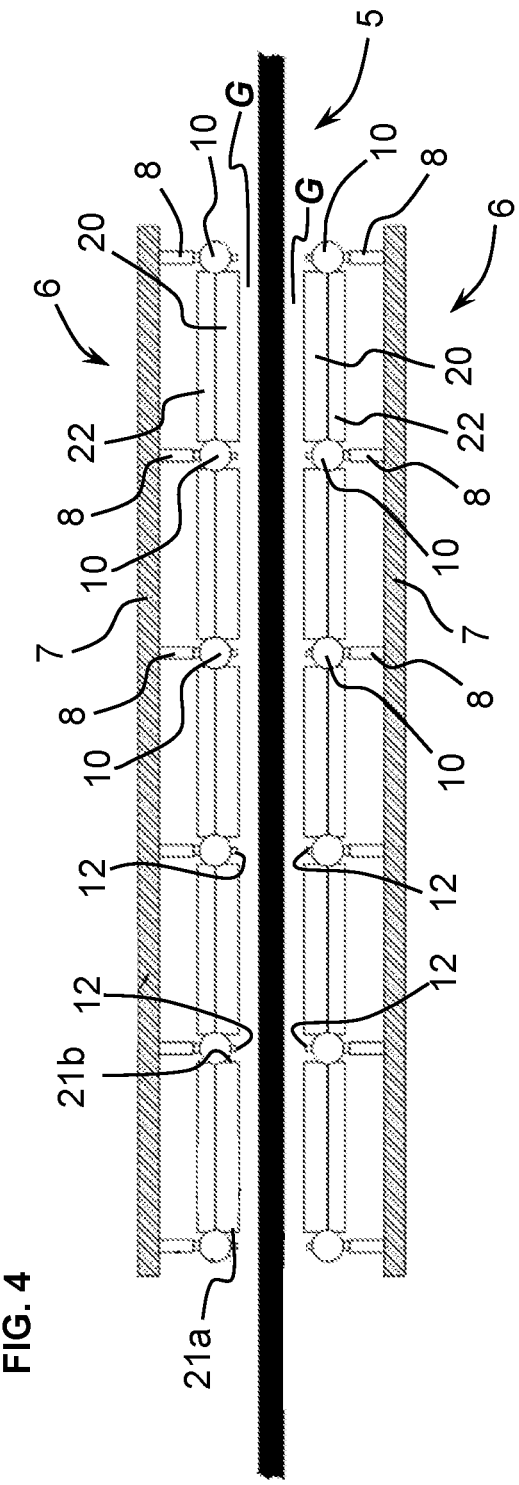
FIG. 4 is a view similar to FIG. 2a of yet another embodiment.

Referring to the figures, a railway system 1 comprises a magnetic levitation railway vehicle 2 and a magnetic levitation railway track 3 along which the railway vehicle is transported. Magnetic levitation railway tracks 3 are per se well-known and may comprise a support rail 3a and a lateral guide rail 3b, or the railway track may comprise an inclined rail that acts as both a support rail and lateral guide rail, or various other configurations that are per se known in the art. In the illustrated embodiment, magnetic levitation railway track is positioned on opposed outer lateral sides of the railway vehicle but other configurations may be adopted without departing from the scope of the invention. The magnetic levitation railway vehicle 2 comprises a levitation device 16 on which is mounted a chassis 18 of a carriage, such elements also being per se well-known. Magnetic levitation railway vehicles may be configured to operate in ambient atmospheric conditions and/or may be configured to operate in a vacuum tube.

The railway system further comprises a linear motor 4 mounted independently of the railway track 3 according to embodiments of the invention. The linear motor and comprises a stator 5 coupled to ground or a support structure fixed to ground, and a mobile motor part 6 that is mounted on the railway vehicle 2, in particular mounted on a bottom side of the chassis 18.

In the illustrated embodiments, a single linear motor is shown mounted centrally under the chassis 18 of the railway vehicle 2, however it is possible to have the motor offset from the center and moreover there may be more than one linear motor, for instance there may be two or more stators extending along the railway track 3 and two or more corresponding mobile motor parts mounted on the bottom side of the chassis.

The stator 5 and mobile motor part 6 may have various configurations based on linear motor designs that function under known principles. For instance the stator may comprise electromagnets formed by coils that may be mounted on a ferromagnetic armature, also called a ferromagnetic core, or alternatively on a non-ferromagnetic armature (i.e. a so-called "coreless stator"), and the mobile motor part may comprise permanent magnets or electromagnets that couple to the stator to generate thrust in the direction of the railway track (hereinafter the "track direction"). The linear motor may also be based on an induction principle whereby the mobile motor part has a conductive plate, optionally with ferromagnetic elements (e.g. soft iron elements), that couple inductively to the electromagnetics of the stator. It is also possible to inverse the motor function by having active electromagnets on the mobile motor part that magnetically couple to permanent magnets on the stator or to electromagnets on the stator, or to an arrangement with conductive plates functioning under the induction principle mentioned above.

In a preferred embodiment, however, the stator comprises coils that form electromagnets and the mobile motor part comprises permanent magnets.

According to an aspect of the invention, the mobile motor part 6 comprises a support 7 and a plurality of actuators 8 coupling motor elements 9 to the support 7. The motor elements comprise a magnet 20 or electromagnet (not shown) or an inductive plate configured to couple magnetically to the stator 5 when the motor is powered to generate thrust in the track direction A.

The magnet 20 may advantageously be mounted on a ferromagnetic core 22 having at least a portion on an outer side of the magnet. An inner side of the magnet is spaced from the stator 5 by an air gap G. As is known in electromagnetic systems, the smaller the air gap G, the higher the efficiency and thus the higher the thrust generated by the motor.

The actuators 8 may, in an advantageous embodiment, be coupled to axial front and rear ends 21a, 21b of each motor element 9, configured to adjust the angle of the magnet 20 with respect to the track direction as well as to adjust the length of the air gap G. The actuators are configured to move in a direction having a component orthogonal to the track direction.

The plurality of motor elements 9 may be arranged in a juxtaposed manner along the stator 5 as illustrated in various figures relating to the different embodiments.

Motor elements may be coupled together via a flexible motor element coupling 10 that may be a mechanical hinge joint with a pivot axis received in a corresponding orifice, or may be made of a flexible material such as a rubber or other elastomer.

The actuators 8 may be in a form of linear actuators that are hydraulically, pneumatically, or electrically controlled. The actuator may for instance comprise a motor with a linear screw and nut system, or comprise a tubular linear motor with a cylindrical mobile element within a cylindrical stator, as per se known in the art of linear actuators.

The linear motor 4 further comprises, according to embodiments of the invention, an air gap sensor 12 that may for instance be mounted on the motor element 9, or on the coupling 10 between motor elements 9, or on an end of the actuator 8 facing an outer lateral side of the stator 5, configured to measure the length of the air gap G. The airgap sensor 12 is preferably an optical sensor, however may also be a sensor of a capacitive, magnetic or inductive type. Other types of per se known proximity sensors may also be used within the scope of the invention.

The airgap sensor 12 and actuators 8 are electrically connected to an electronic control system 14 of the linear motor system 4 in order to control the position of the actuator and thereby the position of the motor element 9 with respect to the stator 5.

As schematically illustrated in FIG. 3, the position sensors 12 indicate the length of the airgap G where each position sensor is positioned along the mobile motor part 6, for instance at the position of each actuator 8. The value of the airgap G is compared with a reference value (set point value) corresponding to the optimal air gap length. The optimal airgap length forming the reference value is a minimum airgap taking into account manufacturing and installation dimensional tolerances, and a certain safety margin, to ensure the mobile element does not touch the stator, requiring a certain air gap between the mobile and static parts.

The airgap measurement values from the airgap sensors are fed into the electronic control system 14 that sends control signals to the actuators 8 to vary the position of the motor elements 9. As for instance illustrated in FIG. 2b, when the stator 5 has a curved shape because of a curved section of railway track, the angle and lateral position of each of the motor elements 9 is adjusted in order to keep a substantially constant optimal airgap G between the inner face of the motor element and the lateral outer face of the stator.

Figure 13A:
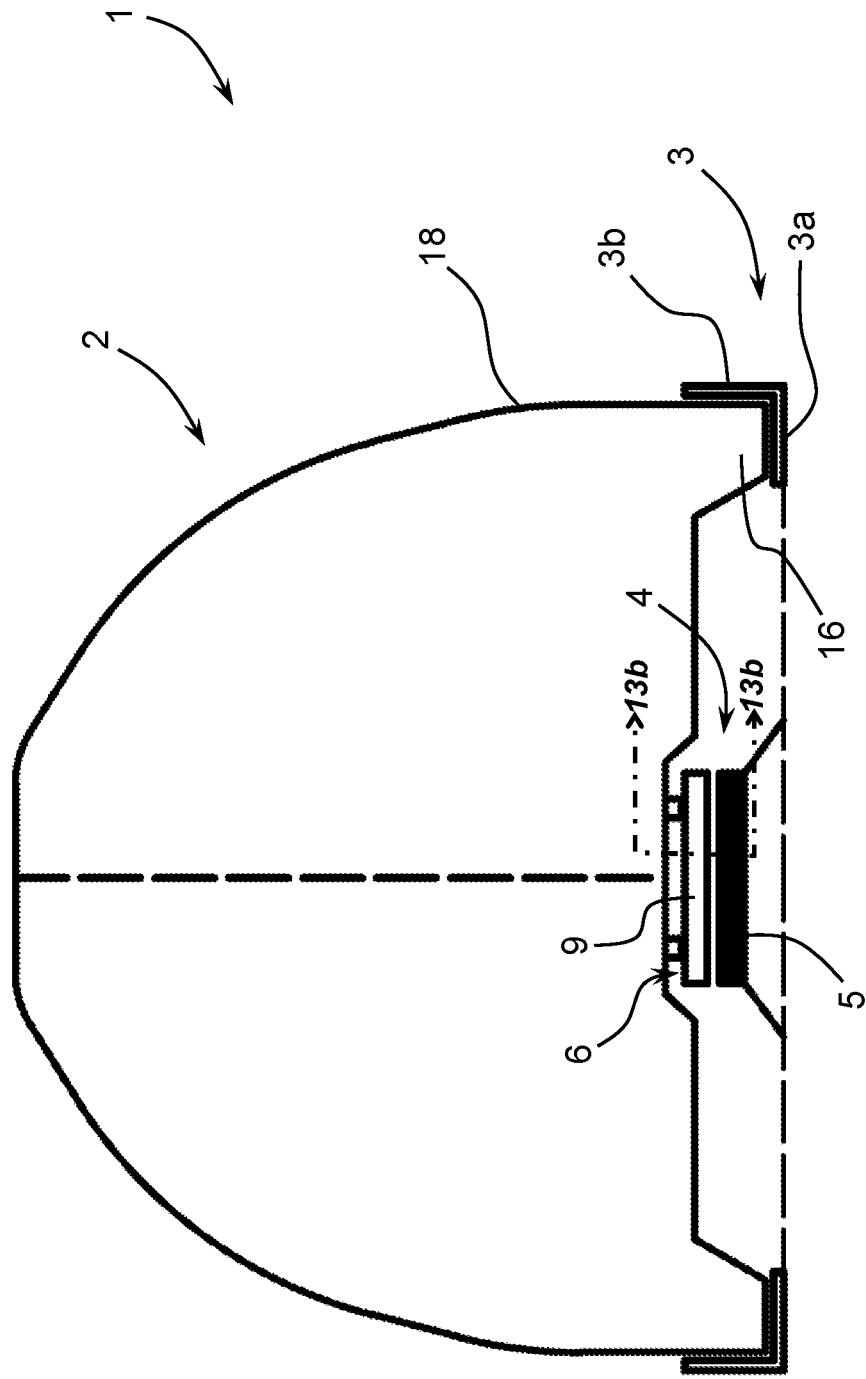
FIGS. 13a, 13b and FIGS. 14a, 14b are views similar to FIGS. 12a, 12b respectively of yet other embodiment.
Figure 13B:
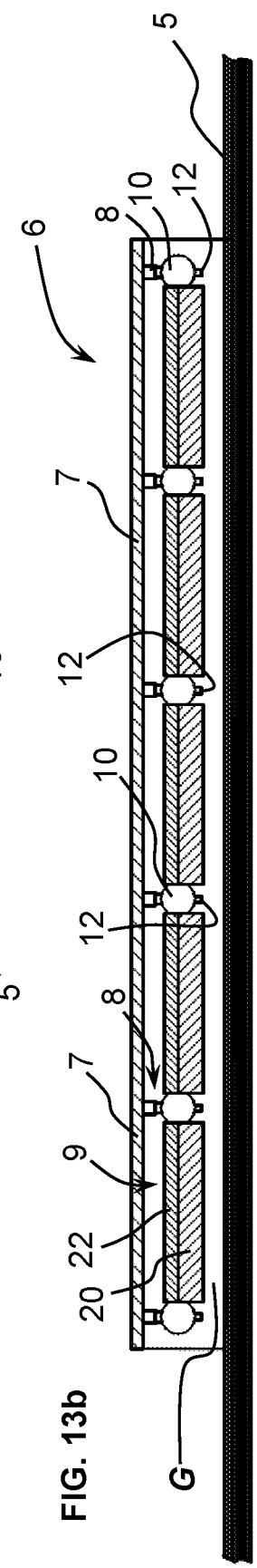

In a preferred embodiment, as illustrated in FIGS. 12a and 12b, the stator 5 upstands vertically from the track ground or base, positioned centrally or substantially centrally between the pair of railway tracks 3, the mobile motor part 6 comprising motor elements 9 on opposed outer lateral sides of the stator 5. The mobile motor elements 9 on both sides of the stator 5 are coupled to respective supports 7 and moveable in a direction orthogonal to the track direction A by actuators 8 connected to a control system fed with position information from the airgap sensors as already described above. The pair of mobile motor parts on opposed outer sides of the stator allows to generate a high power to size factor however it is possible to have a mobile part only on one side of the stator for instance as disclosed in FIGS. 2a and 2b or in FIGS. 13a and 13b. Another embodiment as illustrated in FIGS. 13a and 13b, the linear motor may arranged substantially horizontally, in other words the top surface of the stator 5 is substantially parallel to the track ground base (orthogonal to the vertical), the mobile motor elements 9 fixed under the chassis 18 of the railway vehicle separated by an airgap G. In this case, the actuators 8 serve to move the mobile elements 9 to control the vertical airgap due to height variation in the position of the stator relative to the railway vehicle due to for instance an evenness in the ground surface on which the railway track is mounted.

Figure 14A:
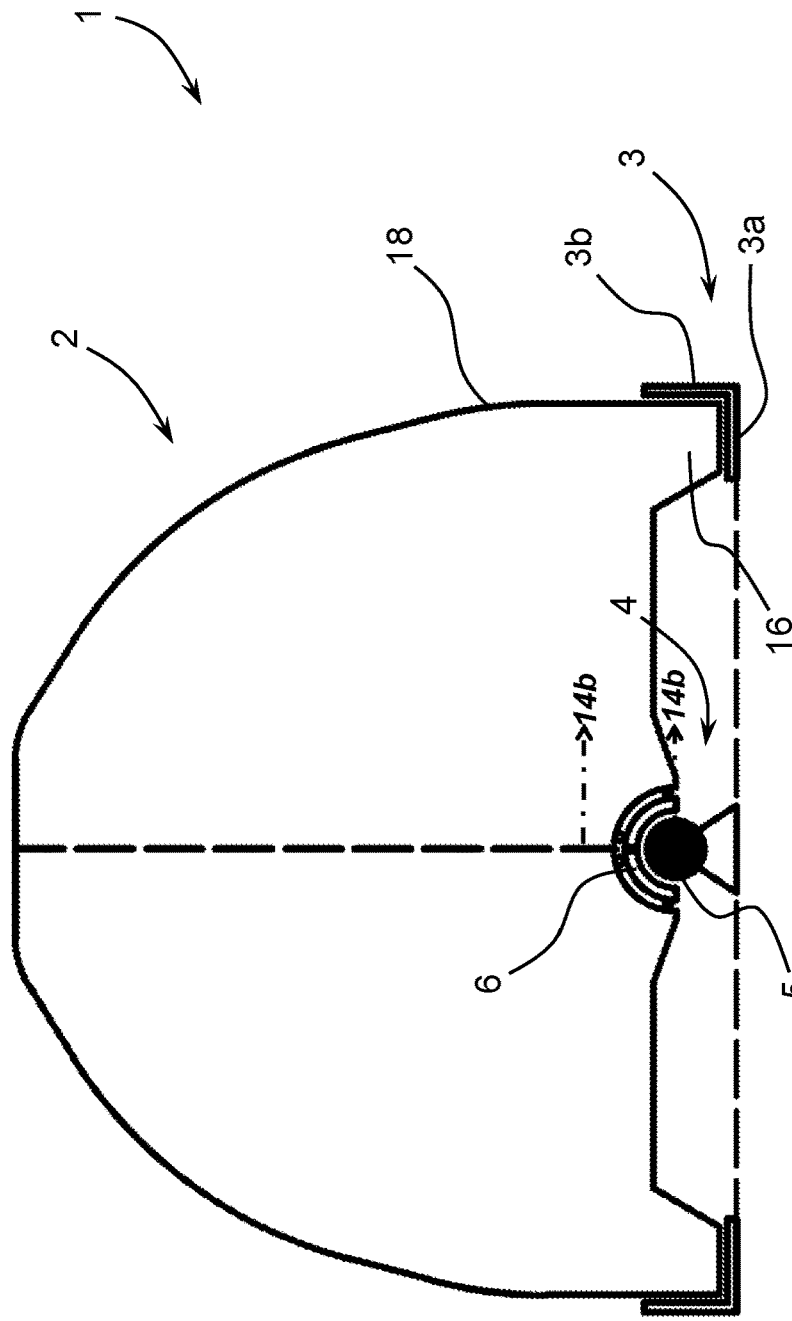
Figure 14B:
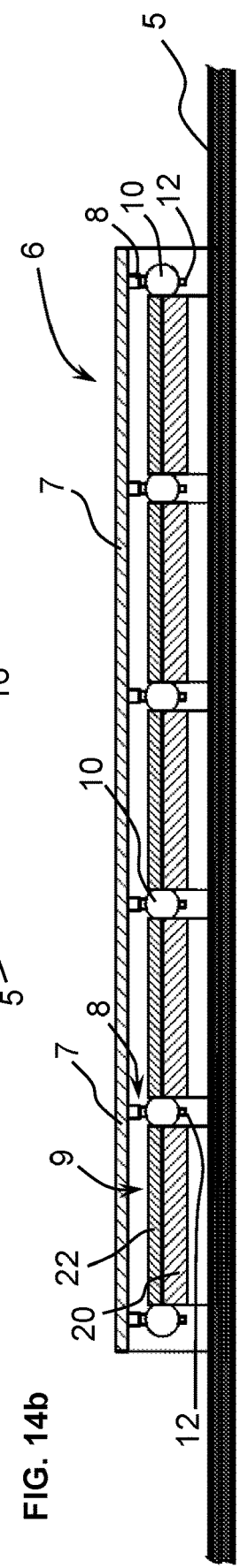

In the embodiment for instance as illustrated in FIGS. 14*a* and 14*b*, the stator 5 may have a cylindrical or curved profile (e.g. elliptical) and the mobile motor elements having a corresponding profile for a substantially constant airgap, matching the profile of the stator outer surface. In the embodiment illustrated, the mobile motor part comprises two sets of motor elements arranged substantially symmetrically about a vertical plane, the positioning of the mobile motor elements adjusting for both variations in height of the stator relative to the railway vehicle as well as variations in the curvature of the railway track.

In a variant of the upstanding stator embodiment illustrated in FIGS. 12*a* and 12*b*, the mobile motor part may have only a single motor part on one lateral side of the stator.

In a variant of the embodiment of FIGS. 14*a* and 14*b*, the stator may for instance have a pyramidal or triangular cross-sectional profile such that the stator surfaces and mobile elements are arranged at an inclined angle between a vertical plane and a horizontal plane.

The mobile elements 9 may be coupled to actuators such that not only the position with respect to the stator outer surface is adjusted, but also the tilt angle of the mobile elements as schematically illustrated in FIGS. 15*a* and 15*b*.

As illustrated in FIG. 11, the actuator 8 may comprise a first actuation device 8*a* and a second actuation device 8*b*. The first actuation device 8*a* is for a coarse adjustment of the position of the mobile element 9 relative to the stator 5 and the second actuation device is for a fine adjustment of the position of the mobile element 9. The fine adjustment may in particular be useful to adjust for high frequency changes in the position of the mobile motor element relative to the stator for instance due to an unevenness in the shape of the outer surface of the stator, or due to vibration and movements of the stator relative to the mobile motor part. The coarse adjustment may performed by an actuation device that is hydraulic, pneumatic, electromagnetic, based on a linear motor with a nut and screw device as already described above. The fine adjustment may be based for instance on a piezoelectric or actuator. A piezoelectric actuator can be fine adjustment actuation advice and also configured to act much more rapidly and the coarse adjustment device for instance in order to adjust for variations due in the airgap length due to vibration or mechanical tolerances.

In embodiments for instance as schematically illustrated in FIG. 9, each of the actuators may be provided with its own control system 14*a*, 14*b*, . . . 14*f*, receiving signals from a corresponding position or airgap sensor 12*a*, 12*b*, . . . 12*f* for instance each mounted on an end of the actuator 8 facing the stator surface, or on a motor element coupling 10 or on a motor element 9 in close proximity to an actuator 8 so that the airgap G at the position of the corresponding actuator is accurately controlled. Alternatively, or in addition, a plurality of actuators 8 may be connected to a single central control system 14, as illustrated schematically in FIG. 10, being fed signals from a plurality of airgap sensors 12 that are preferably positioned as already described above. The central control advantageously allows to use information from downstream airgap sensors to assist in control on mobile elements positioned upstream by anticipating the curvature and thus the position of the mobile elements over the entire length of the mobile motor part 6.

The mobile motor part 6 may comprise a plurality of motor elements 9 coupled to at least one corresponding actuator, for instance between four to ten motor elements, however in other embodiments, the mobile motor part 6 may comprise a plurality of motor elements forming small segments 24 that are coupled together via motor element couplings 10 in the form of flexible joints 26 for instance as illustrated in FIG. 5*a* to FIG. 8. The segmented motor elements with flexible joints allow a finer variation of the profile of the mobile motor parts 6 to the curvature of the stator 5.

Each of the segments 24 may comprise a permanent magnet 20 and a ferromagnetic core 22.

The flexible joint 26 may extend over a portion of the segments 24 for instance as illustrated in FIGS. 7*a* and 7*b*, for instance coupling the ferromagnetic cores 22 of adjacent segments. This allows an easier tilting of one segment relative to other for instance as illustrated in FIG. 7*b* in order to curve the mobile motor element 9. The flexible joint 26 may however extend over the whole interface between the segments as illustrated in FIGS. 6*a* and 6*b*.

The flexible joint 26 preferably has a relative magnetic permeability $\mu_{air}$ greater than one by having an elastomer embedded with ferromagnetic metal alloys or for example comprising a mechanical spring enclosed in a sealed chamber field with a ferromagnetic material.

The flexible joint may also have a sandwich structure as illustrated in FIG. 8 comprising a ferromagnetic material 27 such as a soft iron, cobalt iron alloy, or even a magnet, sandwiched between layers 28 of an elastomer containing particles of a ferromagnetic material such as $FE_3O_4$ The layers of elastomer have a width preferably less than 30 millimeters. On either outer lateral side of the flexible joint is positioned the magnet 20 of the segment 24. The magnetic may as previously mentioned be a permanent magnet, or may be a coil connected to an electrical circuit to form an electromagnet.

The segments 24 may be mounted on a common flexible support 25 that is bendable to a degree required by the maximum curvature of the track and thus of the stator 5, whereby the number of actuators 8 is at least 3, one on either end in the track direction and one at or close to the center of the mobile motor part. There may be additional actuators in order to have a finer control of the curvature of the motor element 9 of the mobile motor part 6. The segments 24 may also be mounted on two or more flexible supports, depending on the length of the linear motor and manufacturing considerations forming the linear motor mobile parts.

Actuation devices to tilt the mobile motor elements or the segments 24 may also be provided to twist the mobile motor segments. For instance, the mobile motor segments of the embodiments of FIGS. 5*a* and 5*b* may be implemented in a linear motor arrangement of FIGS. 13*a* and 13*b* and flexible joints allowing the change in angle about a vertical access (Y axis) and about a horizontal axis (X axis) such that both the horizontal track curvature and the relative inclination angle of the railway vehicle to the track may be adjusted form.

It may be noted that the support 7 of the mobile motor part 6 may form part of the chassis 18 of the railway vehicle or a part that is fixed to the chassis 18.

Although the linear motor according to embodiments of the illustrated invention are particularly well adapted for use in magnetic levitation railway systems, the linear motor may also be used for the propulsion of other devices for instance in a conveyor system in a manufacturing plant or in mining operations, or for the guided propulsion of a projectile.

LIST OF REFERENCES

Railway system 1
  magnetic levitation railway vehicle 2
    levitation device 16
    chassis 18
  magnetic levitation railway track 3
    support rail 3a
    lateral guide rail 3b
  Linear motor 4
    stator 5
    mobile motor part 6
      support 7
      actuator 8
        first actuator 8'
        second actuator 8"
      motor element 9
        magnet 20
        (ferromagnetic) core (or armature) 22
        segments 24
          magnet 20
          (ferromagnetic) core (or armature) 22
          flexible joint 26
            magnet, ferromagnetic element 27
            elastic layer 28
        flexible support 25
      motor element coupling 10
      airgap sensor 12
      control system 14

The invention claimed is:

1. Linear motor system comprising a stator, and a mobile motor part comprising at least one motor element separated from the stator by an airgap (G) configured to be electromagnetically coupled thereto to generate thrust on the mobile motor part in a track direction (A), at least one of the stator and the mobile motor part comprising an electromagnet and at least the other of the stator and mobile motor part comprising one or more of a permanent magnet, an electromagnet, an induction plate, wherein the linear motor further comprises at least one control system, airgap sensors connected to the control system configured to measure a length of the airgap between the mobile motor part and the stator, and actuators connected to the control system coupled to a support of the mobile motor part and to the motor element, the actuators receiving control signals from the control system to adjust said length of the airgap, wherein the mobile motor part comprises a plurality of motor elements connected together via hinge coupling elements or a motor element comprises a plurality of segments connected together via flexible hinges, wherein the coupling elements or hinges comprise flexible material including an elastomer.

2. Linear motor system according to claim 1, wherein the flexible material comprises an elastomeric material with ferromagnetic properties, for instance an elastomer with ferromagnetic particles embedded therein.

3. Linear motor system comprising a stator, and a mobile motor part comprising at least one motor element separated from the stator by an airgap (G) configured to be electromagnetically coupled thereto to generate thrust on the mobile motor part in a track direction (A), at least one of the stator and the mobile motor part comprising an electromagnet and at least the other of the stator and mobile motor part comprising one or more of a permanent magnet, an electromagnet, an induction plate, wherein the linear motor further comprises at least one control system, airgap sensors connected to the control system configured to measure a length of the airgap between the mobile motor part and the stator, and actuators connected to the control system coupled to a support of the mobile motor part and to the motor element, the actuators receiving control signals from the control system to adjust said length of the airgap, wherein the mobile motor part comprises a plurality of motor elements connected together via hinge coupling elements or a motor element comprises a plurality of segments connected together via flexible hinges, wherein a plurality of said motor segments are mounted on a flexible support.

4. Linear motor system according to claim 3, wherein the flexible hinges extend over a portion of an interface between adjacent segments.

5. Linear motor system according to claim 3, wherein the hinge coupling elements comprise a mechanical pivot and axis hinge.

6. Linear motor system according to claim 3, wherein the stator comprises electromagnetic coils producing the thrust energy and the mobile motor part comprises motor elements or segments with permanent magnets.

7. Linear motor system according to claim 3, wherein the mobile motor part comprises ferromagnetic cores and magnets mounted thereon facing the stator.

8. Linear motor system according to claim 3, wherein the airgap sensors are mounted at an end of each actuator, or on each of the hinge coupling elements, or on mobile motor segments at a position proximate the actuator.

9. Linear motor system according to claim 3, wherein the airgap sensor is selected from a group of optical sensors, inductive sensors, laser sensors, ultrasonic sensors, capacitive sensors.

10. Linear motor system according to claim 3, wherein the actuators are selected from a group of electrical, electromechanical, pneumatic, hydraulic, piezoelectric actuators, or combinations of the foregoing.

11. Linear motor system according to claim 10, wherein the actuator is an electromagnetic actuator comprising an electromagnetic linear motor with a linear nut and screw system.

12. Linear motor system comprising a stator, and a mobile motor part comprising at least one motor element separated from the stator by an airgap (G) configured to be electromagnetically coupled thereto to generate thrust on the mobile motor part in a track direction (A), at least one of the stator and the mobile motor part comprising an electromagnet and at least the other of the stator and mobile motor part comprising one or more of a permanent magnet, an electromagnet, an induction plate, wherein the linear motor further comprises at least one control system, airgap sensors connected to the control system configured to measure a length of the airgap between the mobile motor part and the stator, and actuators connected to the control system coupled to a support of the mobile motor part and to the motor element, the actuators receiving control signals from the control system to adjust said length of the airgap, wherein the mobile motor part comprises a plurality of motor elements connected together via hinge coupling elements or a motor element comprises a plurality of segments connected together via flexible hinges, wherein the hinges comprise a sandwich construction of layers of a magnetic or ferromagnetic material and layers of an elastomeric material doped with a ferromagnetic particles.

13. Linear motor system comprising a stator, and a mobile motor part comprising at least one motor element separated from the stator by an airgap (G) configured to be electromagnetically coupled thereto to generate thrust on the mobile motor part in a track direction (A), at least one of the stator and the mobile motor part comprising an electromagnet and at least the other of the stator and mobile motor part comprising one or more of a permanent magnet, an electromagnet, an induction plate, wherein the linear motor further comprises at least one control system, airgap sensors connected to the control system configured to measure a length of the airgap between the mobile motor part and the stator, and actuators connected to the control system coupled to a support of the mobile motor part and to the motor element, the actuators receiving control signals from the control system to adjust said length of the airgap, wherein the actuator comprises a first actuation device and a second actuation device, the first actuation device generating a coarse adjustment and the second actuation device generating a fine adjustment.

14. Linear motor system according to claim 13, wherein the second actuation device comprises a piezoelectric actuator.

15. Linear motor system comprising a stator, and a mobile motor part comprising at least one motor element separated from the stator by an airgap (G) configured to be electromagnetically coupled thereto to generate thrust on the mobile motor part in a track direction (A), at least one of the stator and the mobile motor part comprising an electromagnet and at least the other of the stator and mobile motor part comprising one or more of a permanent magnet, an electromagnet, an induction plate, wherein the linear motor further comprises at least one control system, airgap sensors connected to the control system configured to measure a length of the airgap between the mobile motor part and the stator, and actuators connected to the control system coupled to a support of the mobile motor part and to the motor element, the actuators receiving control signals from the control system to adjust said length of the airgap, wherein the actuators are individually controlled, each connected to a dedicated control system receiving signals from an airgap sensor at, or proximate, the actuation device.

16. Linear motor system according to claim 15, wherein the control system is a central control system connected to a plurality of actuators and airgap sensors.

17. Linear motor system according to claim 15, wherein the mobile motor part comprises a first portion on one side of the stator and a second portion on the other side of the stator.

18. Linear motor system according to claim 17, wherein the first and second lateral outer surfaces of the stator are vertical, or curved, or inclined.

19. Magnetic levitation railway system comprising a railway vehicle guided on levitation rail tracks, and a linear motor according to claim 15, the mobile motor part being mounted to a chassis of the railway vehicle and the stator coupled to a ground or base.

20. Magnetic levitation railway system according to claim 19, wherein the linear motor is separate and independent of the levitation rail tracks.

21. Magnetic levitation railway system according to claim 20, wherein the linear motor is positioned centrally between a pair of said levitation rail tracks.

* * * * *